INVENTOR.
PAUL DARRELL OWNBY
BY GRAY, MASE & DUNSON
ATTORNEYS

United States Patent Office 3,500,104
Patented Mar. 10, 1970

3,500,104
ELECTRON EMITTER TIPS AND METHOD
Paul Darrell Ownby, Columbus, Ohio, assignor to The Battelle Development Corporation, Columbus, Ohio, a corporation of Delaware
Filed June 23, 1967, Ser. No. 648,373
Int. Cl. H01j *19/06*
U.S. Cl. 313—311                    11 Claims

ABSTRACT OF THE DISCLOSURE

Boron is deposited on the (110) plane facet at the center of a tungsten electron emitter tip by chemical vapor deposition of boron triiodide. The emission current density is greatest in the center of the emitting area (FIG. 2).

BACKGROUND OF THE INVENTION

Very high electron current densities can be produced by field emission of electrons from a metal surface. Current densities of the order of $10^7$ amp/cm.$^2$ can be produced by field emission. These are about a million times the current densities obtainable with thermionic emission. The high current densities are produced with anode voltages of a mere few thousand volts by using a cathode with a very small radius of curvature, in the order of 1000 angstrom units. The field emission microscope utilizes this principle.

Cathodes are produced by chemically or electrochemically etching and polishing wires or crystals to fine points by various means or by using fine whiskers. Cathodes must have high strength to withstand the high field stresses imposed ($10^{10}$ dyne/cm.$^2$). These emitters are small and therefore typically are single crystal surfaces whose shapes can for simplicity be visualized as a hemisphere of emitting surface. The current distribution varies over this surface because of the local field strength and the local work function which depends on the atomic constitution of the surface, i.e., its crystal structure, crystal orientation, chemical nature, and the presence of adsorbed layers.

The attractiveness of the field emitter as a source for electron optics and other devices is reduced because of the wide distribution and variation of the electron current over the emitter surface. To illustrate the problem, we can consider a pattern from a field emission microscope (FEM). This pattern is essentially a map of the emission current density over the emitter surface. Consider a clean tungsten pattern as shown in FIG. 1. Emission is relatively uniform inside the pattern outline, except in the dark spots which represent low index planes of highest work functions. Tungsten is the most widely used and best general material for field emission. However, the texture of drawn tungsten wire is such that the crystals are aligned so that the (110) orientation is virtually always obtained at the point for emitters fabricated from tungsten wire. Unfortunately, the highest work function plane of tungsten (lowest emittance) is this central (110) plane. Therefore, another stable emitter whose current density would be greatest in the center of the tip would be highly desirable for an electron optics source. Sophisticated experiments to produce field emitter tips with only one emitting facet have as yet been unsuccessful. (See Rognet, H., and Mignolet, J. C. P., "Electron Emission From Glass-Coated Metal Tips," presented at the 13th Field Emission Symposium, Cornell, University, September 1966.)

Of work published to date, perhaps the closest approach to an ideal field emission source for this type of application is the well-known "double fried egg" pattern of zirconium on tungsten. Zirconium produces intense emission from the (100) regions of the tungsten tip. A typical pattern comprises two highly emitting circular areas, with somewhat less emission coming from a larger concentric ring around each area. The rest of the pattern, including the central (110) area, is dark. Thus the emission current is split into two widely separated off-axis directions.

The present invention provides stable electron emitter tips from which the emission current is concentrated substantially in a single narrow beam in the direction of the axis of the tip, as is shown by the field emission microscope pattern of FIG. 2. Thus a nearly ideal pattern is obtained having enhanced brightness from a single facet; and the extremely small emitting area provides coherence, facilitating electron interference effects.

SUMMARY OF THE INVENTION

In the present invention, an emitter tip for an electron source comprises a tungsten wire tapering to a fine point having the crystals therein aligned with the (110) plane perpendicular to the axis of the tip at the end of the point and a thin deposit of boron on the (110) plane, whereby the emission current is concentrated substantially in the direction of the axis of the tip. The deposit typically comprises boron from the chemical vapor deposition of boron triiodide.

A preferred method of making such an emitter tip from a tungsten wire wherein the crystals are aligned with the (110) plane perpendicular to its axis comprises tapering an end of the wire to a fine point, and depositing boron on the (110) plane at the end of the point. This may be done by chemical vapor deposition wherein molecules containing boron impinge onto the point with the wire maintained at elevated temperature during the deposition to decompose the molecules and thus to deposit boron on the plane.

The molecules preferably comprise a beam of boron triiodide from a Knudsen cell, having a flux density of about $10^{12}$ to $10^{17}$ molecules per square centimeter per second. The boron typically is deposited for about 1 to 60 minutes, with the wire maintained at about 1200 to 1600° C. Where desired, to assure an optimum emission pattern, the deposit of boron may be substantially desorbed from the (110) plane, and again boron may be deposited thereon.

DESCRIPTION OF THE PREFERRED EMBODIMENTS

Figure 3:
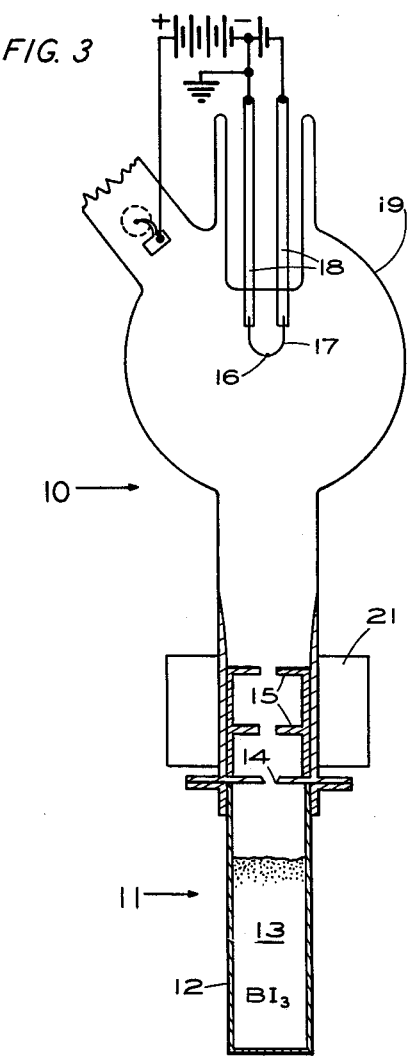
FIG. 3 is a schematic view, largely in longitudinal section, of typical apparatus for depositing boron on a tungsten emitter tip and for producing and recording the field emission microscope pattern of the tip.

Referring to FIG. 3, typical apparatus for preparing and testing electron emitter tips in accordance with the present invention comprises a field emission microscope 10 with a Knudsen cell 11 attached at the bottom thereof. The Knudsen cell 11 comprises a sealed cylindrical copper container 12 partially filled with boron triiodide powder 13 and having an orifice 14. A beam of boron triiodide molecules effuses from the orifice 14 of the cell 12. The orifice 14 is maintained at a slightly higher temperature than the rest of the cell 11 by any suitable means such as a resistance heater (not shown). The beam is collimated by baffles 15, which are cooled by liquid nitrogen in an annular jacket 21. The molecular beam is thereby constrained to impinge upon a tungsten field emitter tip 16, which appears in end view (perpendicular to the plane of the drawing) in FIG. 3.

The emitter tip 16 is permanently connected, as by capacitor discharge welding, to a tungsten support loop 17, which in turn is permanently connected to the electrical feed-through leads 18 mounted in the vacuum-tight glass enclosure 19. The emitter tip 16 comprises the cathode of the field emission microscope 10, and the spherical phosphor coated glass enclosure 19 comprises the anode.

The temperature of the Knudsen cell 11 is controlled to provide the desired molecular beam flux. The field emitter tip is heated resistively to about 1200 to 1600° C. and is maintained at a temperature within this range. The beam of molecules impinging on the emitter tip 16 should have a density of about $10^{12}$ to $10^{17}$ molecules per square centimeter per second. Deposition times of about 1 to 60 minutes are preferred, depending on the molecular beam flux used.

Figure 1:
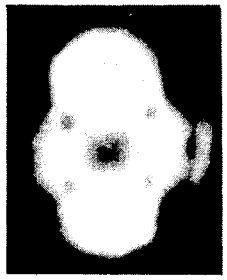
FIG. 1 is a field emission microscope pattern for an electron emitter tip made of clean tungsten.
Figure 2:
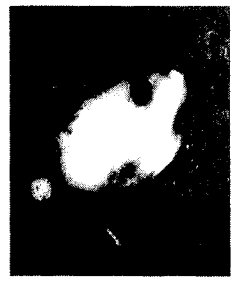
FIG. 2 is a similar pattern for a tip made of tungsten having boron deposited thereon in accordance with this invention.

In a typical run, the emitter tip 16 was heated to about 1400° C. with an impingent flux of about $10^{13}$ molecules per square centimeter per second. In about 15 minutes a deposit was observed growing around the (110) central plane. After 45 minutes of deposition a uniform deposit producing an intense electron emission from this central facet had been obtained, and a photograph of the field emission microscope pattern was taken, as shown in FIG. 2.

Other typical runs provided similar patterns in shorter times with slightly higher fluxes. Some runs were made on emitter tips from which a previous boron deposit had been desorbed at high temperature, about 2200 to 3000° C. For convenience in facilitating optimum results, more than one deposit of boron is sometimes desirable. Each deposit should be substantially desorbed before beginning the next. The deposit may be desorbed thermally, as mentioned above, or by field desorption. The field emission pattern can be observed, to determine that the deposit is satisfactory.

Figure 4:
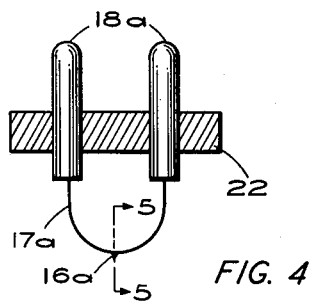
FIG. 4 is a sectional schematic view of an electron emitter tip source packaged for mounting in electron emission apparatus.

FIG. 4 shows schematically a typical replaceable electron emitter component made in accordance with this invention for use particularly in electron optic devices. The emitter tip 16a is affixed to the support loop 17a as shown in FIG. 4 with the tip pointing directly away from the loop 17a and in the plane thereof, parallel to the connectors 18a and perpendicular to the base 22. (The tip 16 is mounted perpendicular to the support loop 17 in FIG. 3 because this is the most convenient position for the emitter in the field emission microscope 10.) The emitter package of FIG. 4 is plugged into a socket appropriately located in the electron optic device or other apparatus in which it is to be used.

Figure 5:
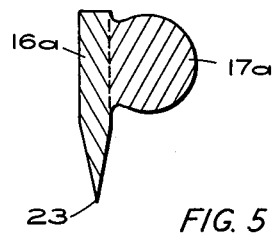
FIG. 5 is a sectional view in the plane 5—5 of FIG. 4.

FIG. 5 is an enlarged sectional view of the emitter tip 16a showing its intimate connection to the support loop 17a for maximum transfer of heat and conduction of electricity between the two members. FIG. 5 is not to scale. The end 23 of the tip 16a has a much more gradual taper than can be shown. The taper in fact is only about 3° in the vicinity of the point 23.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

What is claimed is:

1. An emitter tip for an electron source comprising a tungsten wire tapering to a fine point having the crystals therein aligned with the (110) plane perpendicular to the axis of the tip at the end of said point and a thin deposit of boron on said (110) plane, whereby the emission current is concentrated substantially in the direction of said axis.

2. An emitter tip as in claim 1, wherein said deposit comprises boron from the chemical vapor deposition of boron triiodide.

3. A method of making an emitter tip for an electron source from a tungsten wire wherein the crystals are aligned with the (110) plane perpendicular to its axis that comprises tapering an end of said wire to a fine point, and depositing boron on the (110) plane at the end of said point.

4. A method as in claim 3, wherein said boron is deposited on said (110) plane by chemical vapor deposition.

5. A method as in claim 4, wherein said chemical vapor deposition comprises impinging molecules containing boron onto said point.

6. A method as in claim 5, wherein said wire is maintained at elevated temperature during said deposition to decompose said molecules and thus to deposit boron on said plane.

7. A method as in claim 5, wherein said molecules comprises a beam of boron triiodide from a Knudsen cell.

8. A method as in claim 5, wherein said molecules impinge on said point at a rate of about $10^{12}$ to $10^{17}$ molecules per square centimeter per second.

9. A method as in claim 8, wherein said boron is deposited for about 1 to 60 minutes.

10. A method as in claim 6, wherein said wire is maintained at about 1200 to 1600° C.

11. A method as in claim 3, wherein the deposit of boron is substantially desorbed from said plane, and again boron is deposited thereon.

References Cited

UNITED STATES PATENTS 3,259,782    7/1966    Shroff _____ 313—336

WILLIAM L. JARVIS, Primary Examiner

U.S. Cl. X.R.

313—309, 355